(12) United States Patent
Fatemi et al.

(10) Patent No.: US 12,744,419 B2
(45) Date of Patent: Sep. 22, 2026

(54) MAGNET ROTOR ASSEMBLY WITH DEFORMABLE END RINGS

(71) Applicant: GM GLOBAL TECHNOLOGY OPERATIONS LLC, Detroit, MI (US)

(72) Inventors: Alireza Fatemi, Canton, MI (US); Derek Frei Lahr, Ann Arbor, MI (US); Thomas W. Nehl, Shelby Township, MI (US); Anthony Michael Coppola, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 210 days.

(21) Appl. No.: 18/785,608

(22) Filed: Jul. 26, 2024

(65) Prior Publication Data

US 2026/0031667 A1 Jan. 29, 2026

(51) Int. Cl.
*H02K 1/276* (2022.01)
*H02K 1/02* (2006.01)

(52) U.S. Cl.
CPC ............... *H02K 1/276* (2013.01); *H02K 1/02* (2013.01)

(58) Field of Classification Search
CPC .... H02K 1/276; H02K 1/2766; H02K 1/2773; H02K 1/02
USPC ................................ 310/400, 402, 405, 413
See application file for complete search history.

(56) References Cited

U.S. PATENT DOCUMENTS

2010/0237735 A1* 9/2010 Blissenbach ............. H02K 1/02 310/156.53
2014/0346911 A1* 11/2014 Tsuchida ................ H02K 1/246 310/156.53
2016/0028279 A1* 1/2016 Hao ......................... H02K 1/02 310/156.43
2017/0317544 A1* 11/2017 Watanabe .............. H02K 1/276
2022/0140675 A1* 5/2022 Ichigozaki ............. H02K 1/276 310/156.53
2022/0231553 A1* 7/2022 Jin ......................... H02K 1/276

FOREIGN PATENT DOCUMENTS

DE 112015005014 T5 8/2017
DE 102023108331 A1 10/2023

* cited by examiner

*Primary Examiner* — Michael Andrews
(74) *Attorney, Agent, or Firm* — Ingrassia Fisher & Lorenz

(57) ABSTRACT

A magnet rotor assembly includes a rotor core having a rotor core length along a longitudinal axis. A plurality of partially ground magnets are disposed at partially ground magnet locations within the rotor core, have a magnet length extending along the longitudinal axis, a first partially ground magnet end, and a second partially ground magnet end. A deformable end ring is disposed at an end of the rotor core to retain the partially ground magnets within the rotor core. The deformable end ring includes a plurality of deformable areas. Each of the deformable areas corresponds to a partially ground magnet location. A partially ground magnet has an associated magnet length that is greater than the rotor core length and a partially ground magnet end of that partially ground magnet abuts against a first deformable area of the deformable end ring causing a deformation of the first deformable area.

20 Claims, 6 Drawing Sheets

MAGNET ROTOR ASSEMBLY WITH DEFORMABLE END RINGS

INTRODUCTION

The technical field generally relates to rotor assemblies, and more particularly relates to a magnet rotor assembly with deformable end rings.

Magnet rotor assemblies often include high energy magnets having a high coercivity and low energy magnets having a low coercivity. The magnets are disposed within the rotor core of the magnet rotor assembly. An example of a low energy magnet is a ferrite magnet. Fully grinding the ends of the low energy magnets so that the ends of the low energy magnets are flush with end surfaces of the rotor core may be a significant contributor of resources to the low energy magnet manufacturing process.

Accordingly, it is desirable to provide a magnet rotor assembly with deformable end rings. Other desirable features and characteristics will become apparent from the subsequent detailed description and the appended claims, taken in conjunction with the accompanying drawings and the foregoing technical field and background.

SUMMARY

A magnet rotor assembly includes a rotor core having a rotor core length along a longitudinal axis; a plurality of partially ground magnets disposed at a plurality of partially ground magnet locations within the rotor core, each of the plurality of partially ground magnets having an associated magnet length extending along the longitudinal axis, a first partially ground magnet end, and a second opposing partially ground magnet end; and a first deformable end ring disposed at a first end of the rotor core to retain the plurality of partially ground magnets within the rotor core. The first deformable end ring includes a plurality of first deformable areas and each of the plurality of first deformable areas corresponds to one of the plurality of partially ground magnet locations. A first partially ground magnet of the plurality of partially ground magnets has an associated magnet length that is greater than the rotor core length and a first partially ground magnet end of the first partially ground magnet abuts against a first deformable area of the plurality of first deformable areas of the first deformable end ring causing a deformation of the first deformable area of the first deformable end ring.

In at least one embodiment, the magnet rotor assembly further includes a second deformable end ring disposed at a second end of the rotor core to cooperate with the first deformable end ring to retain the plurality of partially ground magnets within the rotor core. The second deformable end ring includes a plurality of second deformable areas and each of the plurality of second deformable areas corresponds to one of the plurality of partially ground magnet locations. A second partially ground magnet of the plurality of partially ground magnets has an associated magnet length that is greater than the rotor core length and a second partially ground magnet end of the second partially ground magnet abuts against a first deformable area of the plurality of second deformable areas of the second deformable end ring causing a deformation of the first deformable area of the second deformable end ring.

In at least one embodiment, the magnet rotor assembly further includes a plurality of fully ground magnets disposed at a plurality of fully ground magnet locations within the rotor core. Each of the plurality of fully ground magnets have an associated magnet length extending along the longitudinal axis that is equal to the rotor core length, a first fully ground magnet end, and a second opposing fully ground magnet end. The first deformable end ring includes a non-deformable area, and the first fully ground magnet ends of the plurality of fully ground magnets are disposed adjacent the non-deformable area of the first deformable ring.

In at least one embodiment, the non-deformable area has a first thickness and each of the plurality of first deformable areas has a second thickness, the first thickness being greater than the second thickness.

In at least one embodiment, each of the plurality of first deformable areas of the first deformable ring has at least one partial cut extending into the first deformable end ring.

In at least one embodiment, each of the plurality of first deformable areas of the first deformable ring has at least one cutout extending through the first deformable end ring.

In at least one embodiment, each of the plurality of first deformable areas of the first deformable ring is a cantilevered beam.

In at least one embodiment, each of the plurality of first deformable areas includes a pocket having a pocket depth, the pocket depth being a difference between the rotor core length and a maximum allowable magnet length of the plurality of partially ground magnets.

In at least one embodiment, the first deformable end ring includes a plurality of closed cell foam caps wherein each of the plurality of closed cell foam caps is disposed in a corresponding one of the plurality of first deformable areas, and the first partially ground magnet end of the first partially ground magnet abuts against a first closed cell foam cap disposed in the first deformable area of the plurality of deformable areas of the first deformable end ring causing the deformation of the first deformable area.

In at least one embodiment, the plurality of partially ground magnets have a first coercivity and the plurality of fully ground magnets have a second coercivity, the second coercivity being higher than the first coercivity.

In at least one embodiment, the magnet rotor assembly further includes at least one of a shim, a spring, and elastomeric material disposed in at least one of the plurality of first deformable areas, and a third partially ground magnet of the plurality of partially ground magnets has an associated magnet length that is less than the rotor core length and a first partially ground magnet end of the third partially ground magnet abuts against the at least one of the shim, the spring, and the elastomeric material disposed on the at least one of the plurality of first deformable areas to maintain a position of the third partially ground magnet within the rotor core.

In at least one embodiment, the rotor core includes a plurality of poles and a number of the plurality of first deformable areas is equal to a number of the plurality of poles.

In at least one embodiment, the plurality of partially ground magnets are ferrite magnets.

An interior permanent magnet motor including a magnet rotor assembly includes a stator assembly and the magnet rotor assembly rotatable relative to the stator assembly. The magnet rotor assembly includes a rotor core having a rotor core length along a longitudinal axis; a plurality of partially ground magnets disposed at a plurality of partially ground magnet locations within the rotor core, each of the plurality of partially ground magnets having an associated magnet length extending along the longitudinal axis, a first partially ground magnet end, and a second opposing partially ground magnet end; and a first deformable end ring disposed at a first end of the rotor core to retain the plurality of partially ground magnets within the rotor core. The first deformable end ring includes a plurality of first deformable areas and each of the plurality of first deformable areas corresponds to one of the plurality of partially ground magnet locations. A first partially ground magnet of the plurality of partially ground magnets has an associated magnet length that is greater than the rotor core length and a first partially ground magnet end of the first partially ground magnet abuts against a first deformable area of the plurality of first deformable areas of the first deformable end ring causing a deformation of the first deformable area of the first deformable end ring.

In at least one embodiment, the interior permanent magnet motor further includes a plurality of fully ground magnets disposed at a plurality of fully ground magnet locations within the rotor core, each of the plurality of fully ground magnets having an associated magnet length extending along the longitudinal axis that is equal to the rotor core length, a first fully ground magnet end, and a second opposing fully ground magnet end. The first deformable end ring includes a non-deformable area, and the first fully ground ends of the plurality of fully ground magnets are disposed adjacent the non-deformable area of the first deformable ring.

In at least one embodiment, the non-deformable area has a first thickness and each of the plurality of first deformable areas has a second thickness, the first thickness being greater than the second thickness.

In at least one embodiment, each of the plurality of first deformable areas of the first deformable ring has at least one partial cut extending into the first deformable end ring.

In at least one embodiment, each of the plurality of first deformable areas of the first deformable ring has at least one cutout extending through the first deformable end ring.

In at least one embodiment, each of the plurality of first deformable areas of the first deformable ring is a cantilevered beam.

A vehicle including an interior permanent magnet motor includes a stator assembly and a magnet rotor assembly rotatable relative to the stator assembly. The magnet rotor assembly includes a rotor core having a rotor core length along a longitudinal axis; a plurality of partially ground magnets disposed at a plurality of partially ground magnet locations within the rotor core, each of the plurality of partially ground magnets having an associated magnet length extending along the longitudinal axis, a first partially ground magnet end, and a second opposing partially ground magnet end; and a first deformable end ring disposed at a first end of the rotor core to retain the plurality of partially ground magnets within the rotor core. The first deformable end ring includes a plurality of first deformable areas and each of the plurality of first deformable areas corresponds to one of the plurality of partially ground magnet locations. A first partially ground magnet of the plurality of partially ground magnets has an associated magnet length that is greater than the rotor core length and a first partially ground magnet end of the first partially ground magnet abuts against a first deformable area of the plurality of first deformable areas of the first deformable end ring causing a deformation of the first deformable area of the first deformable end ring.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
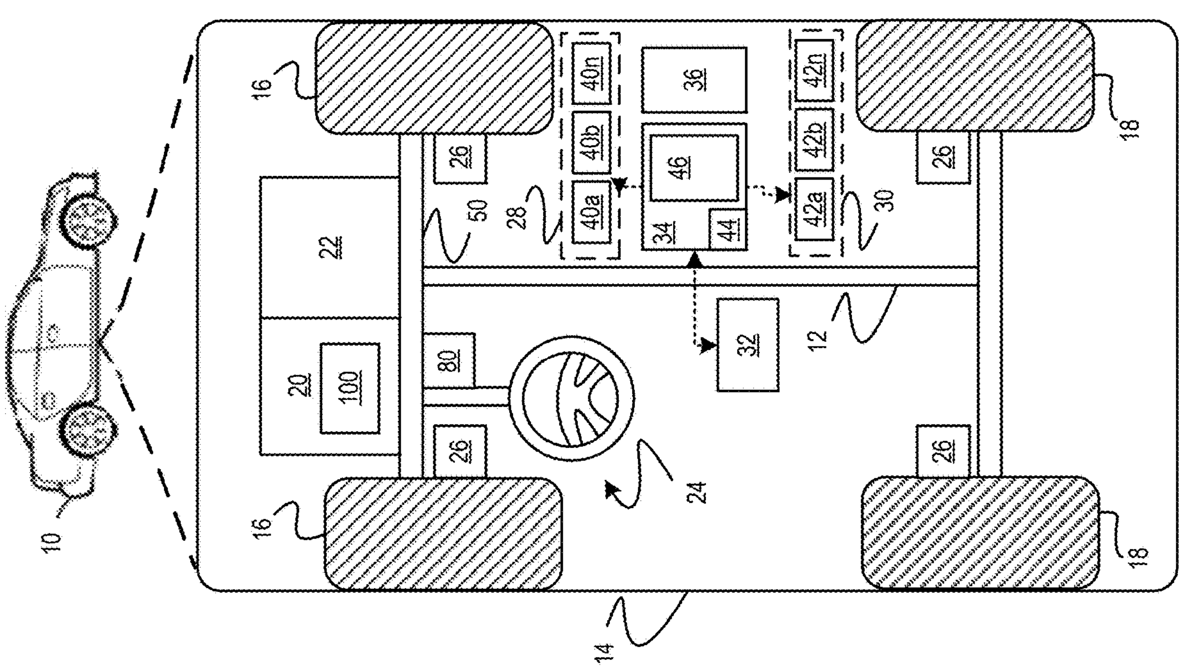
FIG. 1 is a functional block diagram of a vehicle including an interior permanent magnet motor in accordance with at least one embodiment.

Referring to FIG. 1, a functional block diagram of a vehicle including a interior permanent magnet motor 100 in accordance with at least one embodiment is shown. The vehicle 10 generally includes a chassis 12, a body 14, front wheels 16, and rear wheels 18. While the vehicle 10 is depicted in the illustrated embodiment as a passenger car, the vehicle 10 may be other types of vehicles including trucks, sport utility vehicles (SUVs), and recreational vehicles (RVs).

In various embodiments, the body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In various embodiments, the vehicle 10 is an autonomous or semi-autonomous vehicle that is automatically controlled to carry passengers and/or cargo from one place to another. For example, in an exemplary embodiment, the vehicle 10 is a so-called Level Two, Level Three, Level Four or Level Five automation system. Level two automation means the vehicle assists the driver in various driving tasks with driver supervision. Level three automation means the vehicle can take over all driving functions under certain circumstances. All major functions are automated, including braking, steering, and acceleration. At this level, the driver can fully disengage until the vehicle tells the driver otherwise. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

As shown, the vehicle 10 generally includes a propulsion system 20 a transmission system 22, a steering system 24, a braking system 26, a sensor system 28, an actuator system 30, at least one data storage device 32, at least one controller 34, and a communication system 36. The controller 34 is configured to implement an automated driving system (ADS). The propulsion system 20 is configured to generate power to propel the vehicle. The propulsion system 20 may, in various embodiments, include an interior permanent magnet electric machine 100 (also referred to as an interior permanent magnet motor) such as a traction motor, a fuel cell propulsion system, and/or any other type of propulsion configuration. The interior permanent magnet motor 100 includes a magnet rotor assembly. The magnet rotor assembly includes deformable end rings. The transmission system 22 is configured to transmit power from the propulsion system 20 to the vehicle wheels 16-18 according to selectable speed ratios. According to various embodiments, the transmission system 22 may include a step-ratio automatic transmission, a continuously-variable transmission, or other appropriate transmission. The braking system 26 is configured to provide braking torque to the vehicle wheels 16-18. The braking system 26 may, in various embodiments, include friction brakes, brake by wire, a regenerative braking system such as an electric machine, and/or other appropriate braking systems.

The steering system 24 is configured to influence a position of the of the vehicle wheels 16. While depicted as including a steering wheel and steering column, for illustrative purposes, in some embodiments contemplated within the scope of the present disclosure, the steering system 24 may not include a steering wheel and/or steering column. The steering system 24 includes a steering column coupled to an axle 50 associated with the front wheels 16 through, for example, a rack and pinion or other mechanism (not shown). Alternatively, the steering system 24 may include a steer by wire system that includes actuators associated with each of the front wheels 16.

The sensor system 28 includes one or more sensing devices 40*a*-40*n* that sense observable conditions of the exterior environment and/or the interior environment of the vehicle 10. The sensing devices 40*a*-40*n* can include, but are not limited to, radars, lidars, global positioning systems, optical cameras, thermal cameras, ultrasonic sensors, a steering wheel sensor, and/or other sensors.

The vehicle dynamics sensors provide vehicle dynamics data including longitudinal speed, yaw rate, lateral acceleration, longitudinal acceleration, etc. The vehicle dynamics sensors may include wheel sensors that measure information pertaining to one or more wheels of the vehicle 10. In one embodiment, the wheel sensors comprise wheel speed sensors that are coupled to each of the wheels 16-18 of the vehicle 10. Further, the vehicle dynamics sensors may include one or more accelerometers (provided as part of an Inertial Measurement Unit (IMU)) that measure information pertaining to an acceleration of the vehicle 10. In various embodiments, the accelerometers measure one or more acceleration values for the vehicle 10, including latitudinal and longitudinal acceleration and yaw rate. In at least one embodiment, the vehicle dynamic sensors provide vehicle movement data.

The actuator system 30 includes one or more actuator devices 42*a*-42*n* that control one or more vehicle features such as, but not limited to, one or more vehicle wheels 16-18 the propulsion system 20, the transmission system 22, the steering system 24, and the braking system 26. In various embodiments, the vehicle features can further include interior and/or exterior vehicle features such as, but are not limited to, doors, a trunk, and cabin features such as air, music, lighting, etc. (not numbered).

The communication system 36 is configured to wirelessly communicate information to and from other entities 48, such as but not limited to, other vehicles ("V2V" communication,) infrastructure ("V2I" communication), remote systems, and/or personal devices. In an exemplary embodiment, the communication system 36 is a wireless communication system configured to communicate via a wireless local area network (WLAN) using IEEE 802.11 standards or by using cellular data communication. However, additional, or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The data storage device 32 stores data for use in the ADS of the vehicle 10. In various embodiments, the data storage device 32 stores defined maps of the navigable environment. In various embodiments, the defined maps may be predefined by and obtained from a remote system. For example, the defined maps may be assembled by the remote system and communicated to the vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor-based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although only one controller 34 is shown in FIG. 1, embodiments of the vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the vehicle 10. In various embodiments, the controller(s) 34 are configured to implement ADS.

Figure 2:
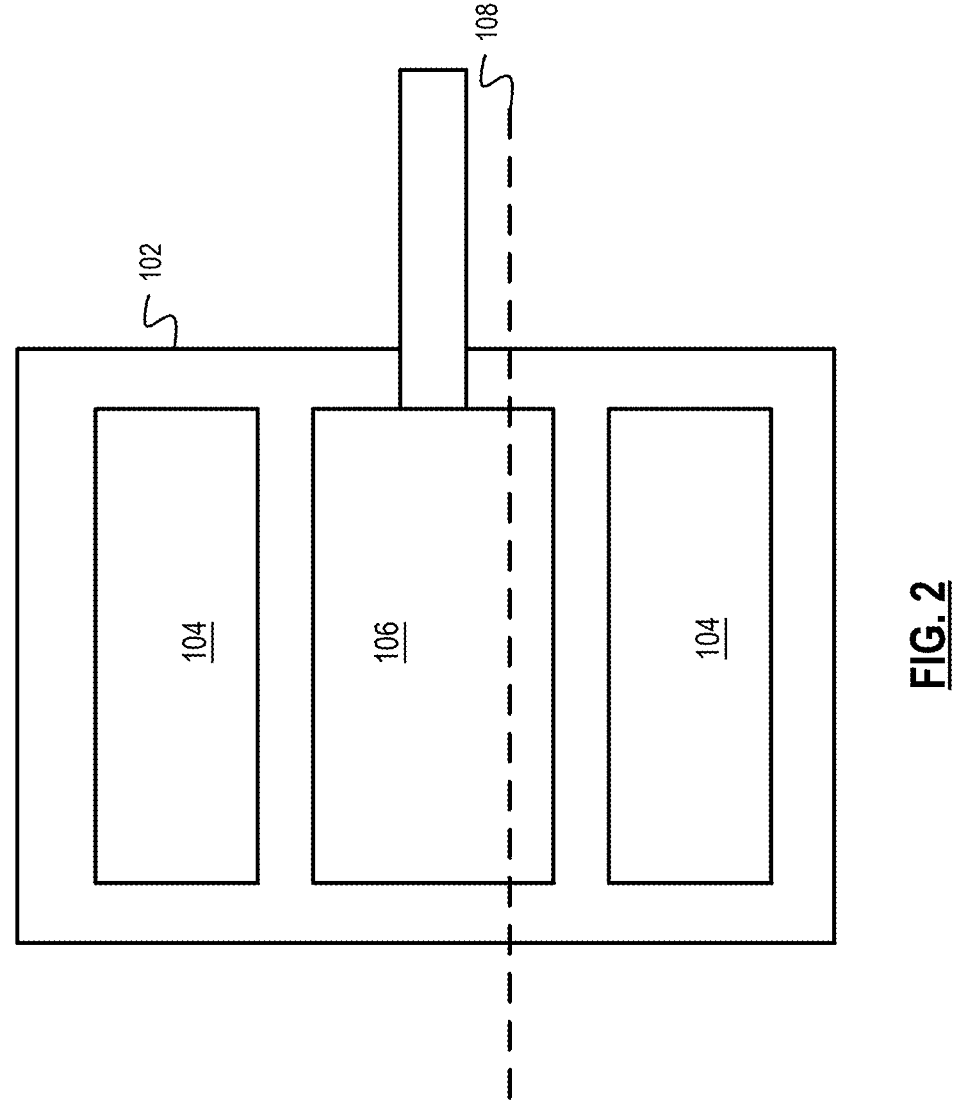
FIG. 2 is a functional block diagram of an interior permanent magnet motor in accordance with at least one embodiment.

Referring to FIG. 2, a functional block diagram of an interior permanent magnet motor 100 in accordance with at least one embodiment is shown. The interior permanent magnet motor 100 includes a housing 102. A stator assembly 104 and a magnet rotor assembly 106 are disposed within the housing 102. The magnet rotor assembly 106 is disposed within a central opening of the stator assembly 104 and is rotatable with respect to the stator assembly 104. A longitudinal axis 108 extends along a rotor core length of the magnet rotor assembly 106. The magnet rotor assembly 106 includes a rotor core and a plurality of partially ground magnets and fully ground magnets disposed within the rotor core. The magnet rotor assembly 106 includes two deformable end rings disposed on either end of the rotor core.

Figure 3:
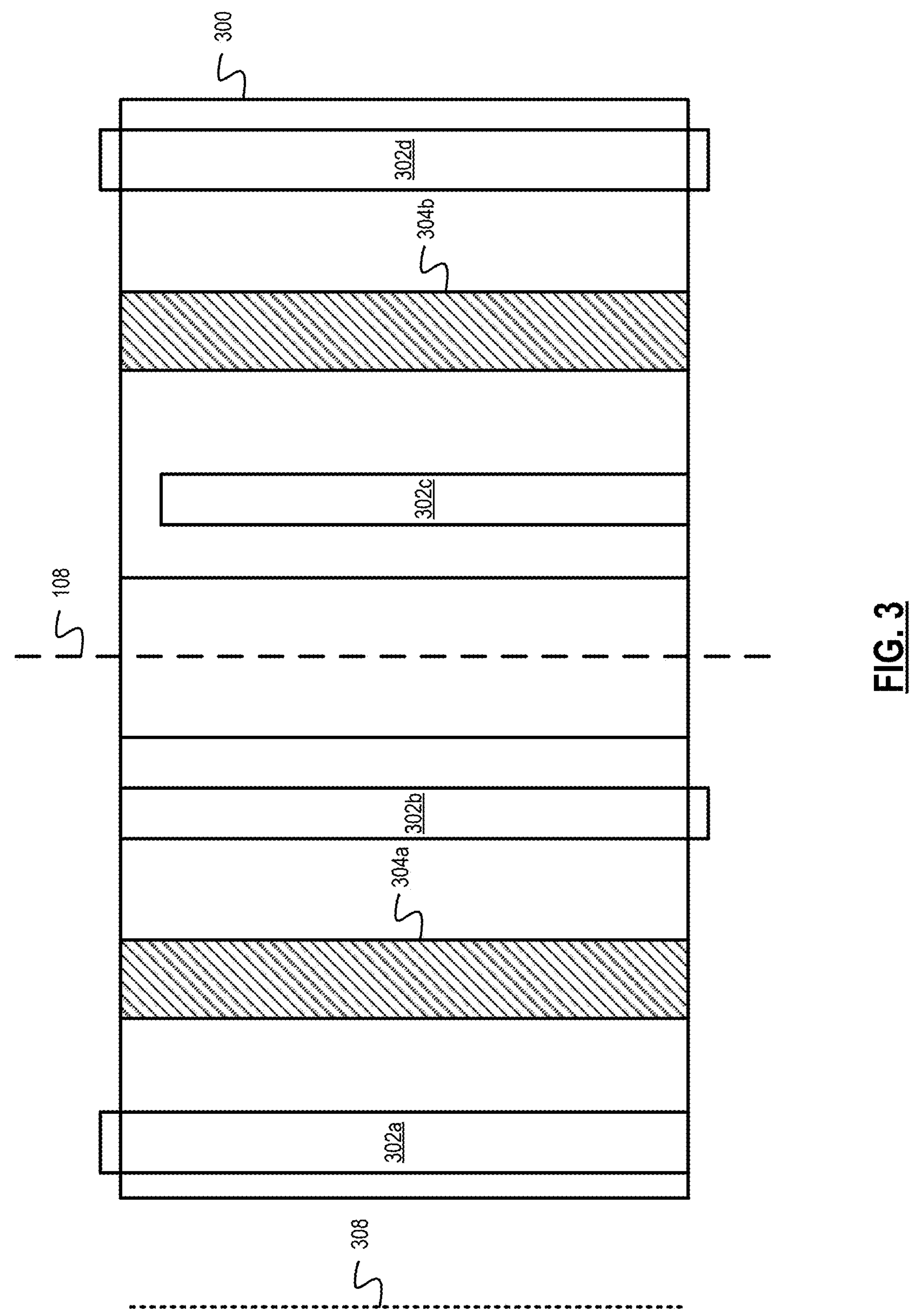
FIG. 3 is a functional block diagram of a side view of a rotor core of a magnet rotor assembly in accordance with at least one embodiment.

Referring to FIG. 3, a functional block diagram of a side view of a rotor core 300 of a magnet rotor assembly 106 in accordance with at least one embodiment is shown. The rotor core 300 may also be referred to as a rotor stack. The rotor core 300 includes a plurality of partially ground magnets 302*a*, 302*b*, 302*c*, 302*d* and a plurality of fully ground magnets 304*a*, 304*b*. The partially ground magnets 302*a*, 302*b*, 302*c*, 302*d* are disposed at partially ground magnet locations within the rotor core 300. The fully ground magnets 304*a*, 304*b* are disposed at fully ground magnet locations within the rotor core 300.

In at least one embodiment, the partially ground magnets are low energy magnets, and the fully ground magnets are high energy magnets. The high energy magnets have a higher coercivity that the low energy magnets. An example of a low energy magnet is a ferrite magnet. Examples of high energy magnets include, but are not limited to, samarium cobalt magnets, neodymium magnets, high energy density permanent magnets, and rare earth permanent magnets.

The rotor core 300 has a rotor core length 308. The rotor core length 308 extends along the longitudinal axis 108. The fully ground magnets 304*a*, 304*b* have fully ground magnet ends. The fully ground magnet ends are flush with the end surfaces of the rotor core 300. Each of the fully ground magnets 304*a*, 304*b* have a magnet length that extends along the longitudinal axis 108. The magnet length of the fully ground magnets 304*a*, 304*b* is equal to the rotor core length 308.

The partially ground magnets 302*a*, 303*b*, 302*c*, 302*d* have partially ground magnet ends. Each of the partially ground magnets 302*a*, 303*b*, 302*c*, 302*d* have a magnet length that extends along the longitudinal axis 108. One or more of the partially ground magnets 302*a*, 303*b*, 302*d* have a magnet length that is greater than the rotor core length 308. In at least one embodiment, one or more of the partially ground magnets 302*c* have a magnet length that is less than the rotor core length 308. The grinding process used to partially grind the low energy magnets generates partially ground magnets 302*a*, 303*b*, 302*c*, 302*d* that may have varying lengths. The varying lengths of the partially ground magnets 302*a*, 303*b*, 302*c*, 302*d* generated by the partial grinding process is not predictable.

While the rotor core 300 in FIG. 3 is shown as including four partially ground magnets 302*a*, 303*b*, 302*c*, 302*d*, alternative embodiments of the rotor core 300 may include a greater or fewer number of partially ground magnets. While the rotor core 300 in FIG. 3 is shown as including two partially ground magnets 304*a*, 304*b*, alternative embodiments of the rotor core 300 may include a greater or fewer number of fully ground magnets.

Figure 4:
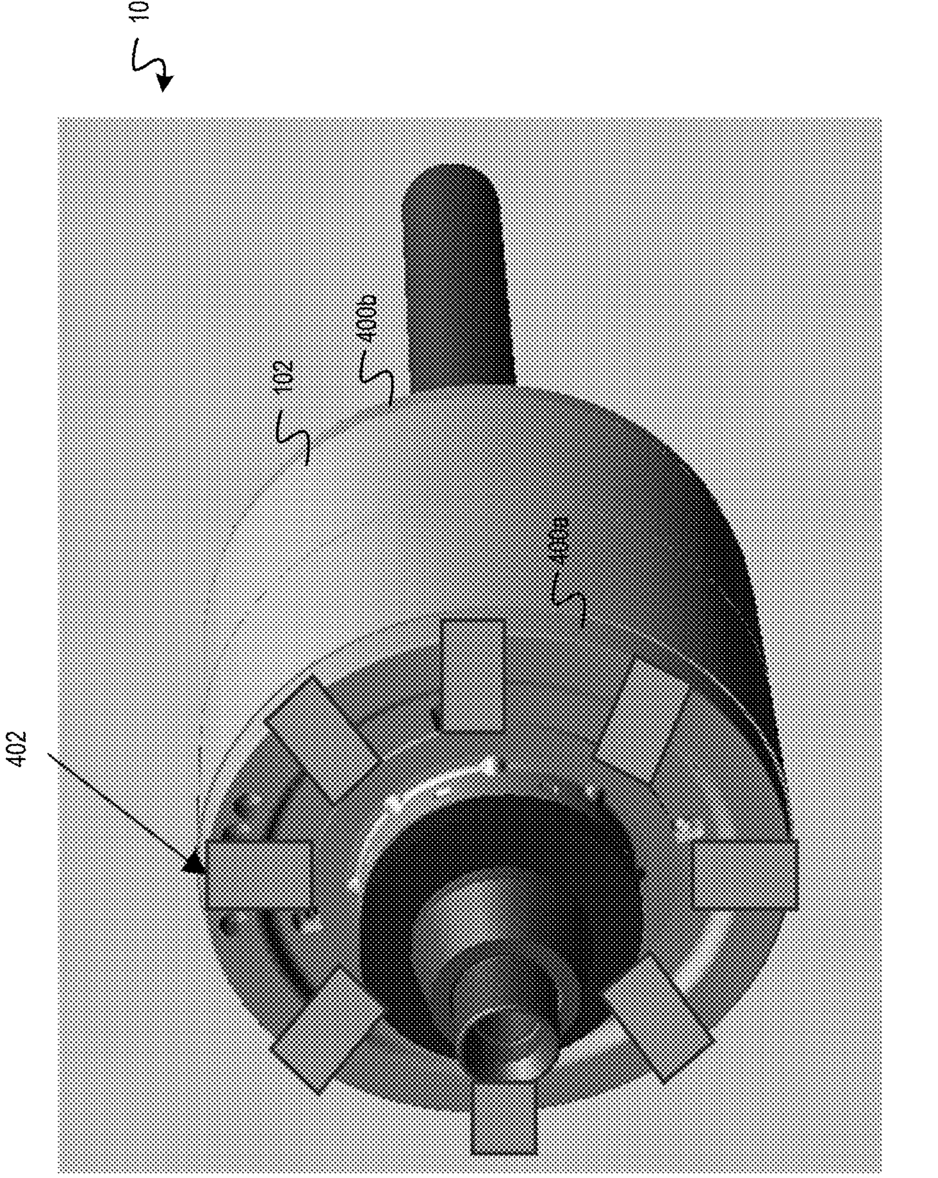
FIG. 4 is an exemplary illustration of a magnet rotor assembly including a deformable end ring including a plurality of deformable areas in accordance with at least one embodiment.

Referring to FIG. 4, an exemplary illustration of a magnet rotor assembly 106 including two deformable end rings 400*a*, 400*b* including a plurality of deformable areas 402 in accordance with at least one embodiment is shown. The rotor core 300 is disposed within the housing 102 of the magnet rotor assembly 106. The magnet rotor assembly 106 includes two deformable end rings 400*a*, 400*b*. A first deformable end ring 400*a* is disposed at a first end of the rotor core 300 and a second deformable end ring 400*b* is disposed at a second end of the rotor core 300. The first and second ends of the rotor core 300 are opposing ends of the rotor core 300. The first and second deformable end rings 400*a*, 400*b* cooperate to retain the partially ground magnets 302*a*, 302*b*, 302*c*, 302*d* and the fully ground magnets 304*a*, 304*b* within the rotor core 300.

The first deformable end ring 400*a* includes a plurality of deformable areas 402. The deformable areas 402 of the deformable end ring 400*a* are depicted using rectangles for convenience. Each of the plurality of partially ground magnets 302*a*, 302*b*, 302*c*, 302*d* are disposed at a corresponding partially ground magnet location within the rotor core 300. Each of the plurality of deformable areas 402 corresponds to one of the partially ground magnet locations. In at least one embodiment, the number of deformable areas 402 in the first deformable end ring 400*a* is equal to a number of partially ground magnets 302*a*, 302*b*, 302*c*, 302*d* disposed within the rotor core 300. The rotor core 300 includes a plurality of poles. In at least one embodiment, the number of deformable areas 402 in the first deformable end ring 400*a* is equal to a number of the plurality of poles in the rotor core 300. The second deformable end ring 400*b* includes deformable areas 402 that are similar in dimension and position as the deformable areas 402 illustrated in the first deformable end ring 400*a*.

The rotor core 300 has a rotor core length 308. When a partially ground magnet 302*a*, 302*b*, 302*d* has a magnet length that is greater than the rotor core length 308, one or both partially ground magnet ends of the partially ground magnet 302*a*, 302*b*, 302*d* extend beyond one or both of the rotor core end surfaces. Referring back to FIG. 3, the partially ground magnet 302*a* has a partially ground magnet end that extends beyond a first rotor core end surface. The partially ground magnet 302*b* has a partially ground magnet end that extends beyond a second rotor core end surface that is opposite the first rotor core end surface. The partially ground magnet 302*d* has a first partially ground magnet end that extends beyond the first rotor core end surface and a second partially ground magnet end that extends beyond the second rotor core surface.

When a partially ground magnet 302*a* has a partially ground magnet end that extends beyond the first rotor core end surface, the partially ground magnet end abuts against a corresponding deformable area 402 of the first deformable end ring 400*a* associated with the partially ground magnet location of that partially ground magnet 302*a*. The force of the partially ground magnet end against the deformable area 402 of the first deformable end ring 400*a* causes a deformation of the deformable area 402. The deformation of the deformable area 402 accommodates the portion of the partially ground magnet that extends beyond the first rotor core surface.

When a partially ground magnet 302*b* has a partially ground magnet end that extends beyond the second rotor core end surface, the partially ground magnet end abuts against a corresponding deformable area 402 of the second deformable end ring 400*b* associated with the partially ground magnet location of that partially ground magnet 302*b*. The force of the partially ground magnet end against the deformable area 402 of the second deformable end ring 400*b* causes a deformation of the deformable area 402. The deformation of the deformable area 402 accommodates the portion of the partially ground magnet that extends beyond the second rotor core surface.

In some cases, the partially ground magnet 302*d* has a first partially ground magnet end that extends beyond the first rotor core end surface and a second partially ground magnet end that extends beyond the second rotor core surface. The partially ground magnet end that extends beyond the first rotor core end surface abuts against a corresponding deformable area 402 of the first deformable end ring 400*a* associated with the partially ground magnet location of that partially ground magnet 302*d*. The force of the partially ground magnet end against the deformable area 402 of the first deformable end ring 400*a* causes a deformation of the deformable area 402. The deformation of the deformable area 402 accommodates the portion of the partially ground magnet that extends beyond the first rotor core surface. The partially ground magnet end that extends beyond the second rotor core end surface abuts against a corresponding deformable area 402 of the second deformable end ring 400*b* associated with the partially ground magnet location of that partially ground magnet 302*d*. The force of the partially ground magnet end against the deformable area 402 of the second deformable end ring 400*b* causes a deformation of the deformable area 402. The deformation of the deformable area 402 accommodates the portion of the partially ground magnet that extends beyond the second rotor core surface.

While the first deformable end ring 400*a* is shown as including eight deformable areas 402 in FIG. 4, alternative embodiments of the deformable rings may include a greater or fewer number of deformable areas.

Figures 5, 6:
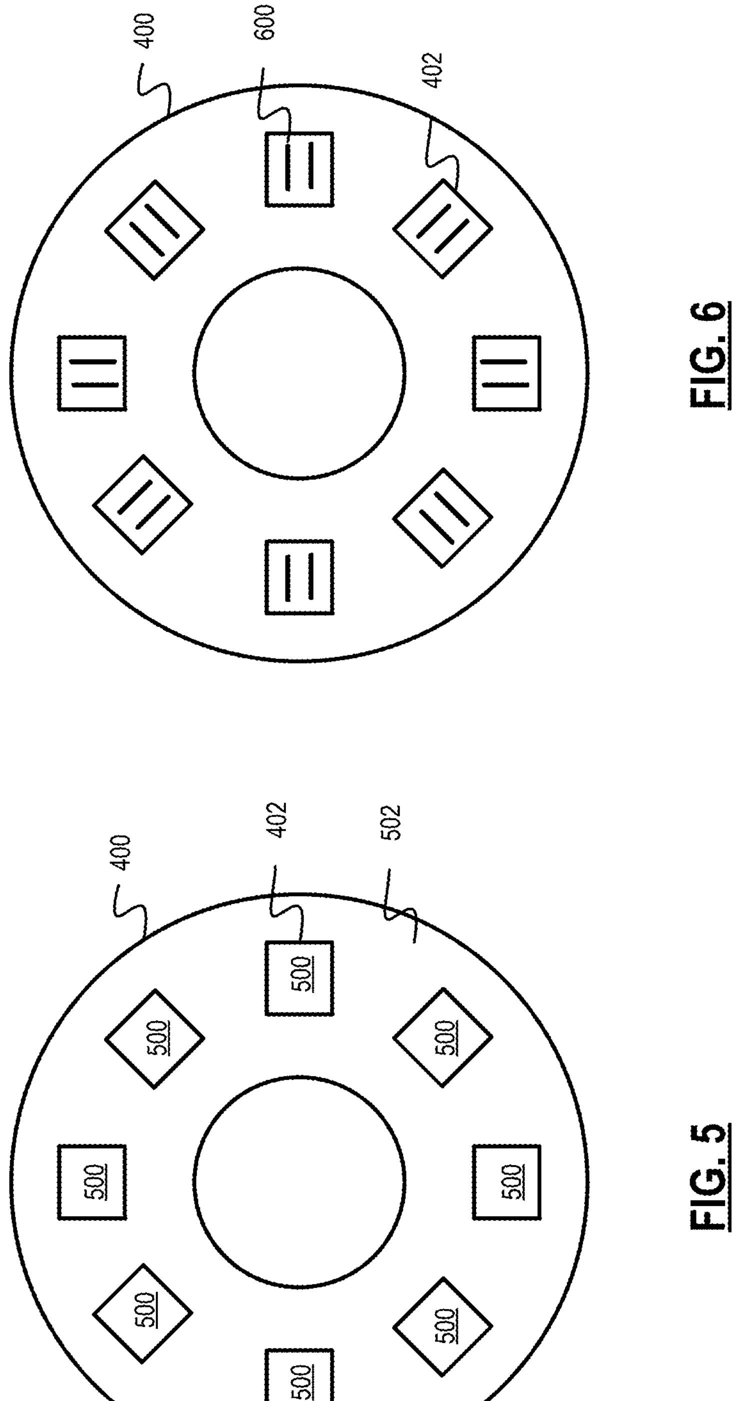
FIG. 5 is a functional block diagram representation of a deformable end ring including a plurality of thinned deformable areas in accordance with at least one embodiment.
FIG. 6 is a functional block diagram representation of a deformable end ring including a plurality of deformable areas in accordance with at least one embodiment.

Referring to FIG. 5, a functional block diagram representation of a deformable end ring 400 (400*a* and 400*b* are collectively referred to as 400) including a plurality of thinned deformable areas 500 in accordance with at least one embodiment is shown. The deformable end ring 400 is a metallic deformable end ring. The deformable end ring 400 includes a plurality of deformable areas 402 and a non-deformable area 502. The non-deformable area 502 has a first thickness. The deformable areas 402 are thinned deformable areas 500. The thinned deformable areas 500 have a second thickness. The second thickness of the thinned deformable areas 500 is less than the first thickness of the non-deformable area 502. A force of a partially ground magnet end of a partially ground magnet 302*a*, 302*b*, 302*d* against a thinned deformable area 500 causes a deformation of the thinned deformable area 500. The deformation of the thinned deformable area 500 accommodates the portion of the partially ground magnet that extends beyond a rotor core surface.

Each of the plurality of partially ground magnets 302*a*, 302*b*, 302*c*, 302*d* is disposed at a partially ground magnet location within the rotor core 300. The location of each of the plurality of thinned deformable areas 500 corresponds to one of the partially ground magnet locations. While the deformable end ring 400 is shown as including eight deformable areas 402 in FIG. 5, alternative embodiments of the deformable rings may include a greater or fewer number of deformable areas.

Referring to FIG. 6, a functional block diagram representation of a deformable end ring 400 (400*a* and 400*b* are collectively referred to as 400) including a plurality of deformable areas 402 in accordance with at least one embodiment is shown. The deformable end ring 400 is a metallic deformable end ring. In at least one embodiment, each of the deformable areas 402 includes one or more partial cuts 600 extending into the deformable end ring 400 but not completely through the deformable end ring 400. A force of a partially ground magnet end of a partially ground magnet 302*a*, 302*b*, 302*d* against the one or more partial cuts 600 causes a deformation of the deformable area 402. The deformation of deformable area 402 accommodates the portion of the partially ground magnet that extends beyond a rotor core surface.

In at least one embodiment, each of the deformable areas 402 includes one or more cutouts 600 extending completely through the deformable end ring. A force of a partially ground magnet end of a partially ground magnet 302*a*, 302*b*, 302*d* against the one or more cutouts 600 causes a deformation of the deformable area 402. The deformation of deformable area 402 accommodates the portion of the partially ground magnet that extends beyond a rotor core surface.

Each of the plurality of partially ground magnets 302*a*, 302*b*, 302*c*, 302*d* is disposed at a partially ground magnet location within the rotor core 300. The location of each of the plurality of deformable areas 402 including either partial cuts 600 or cutouts 600 corresponds to one of the partially ground magnet locations. While the deformable end ring 400 is shown as including eight deformable areas 402 in FIG. 6, alternative embodiments of the deformable rings may include a greater or fewer number of deformable areas.

Figures 7, 8, 9:
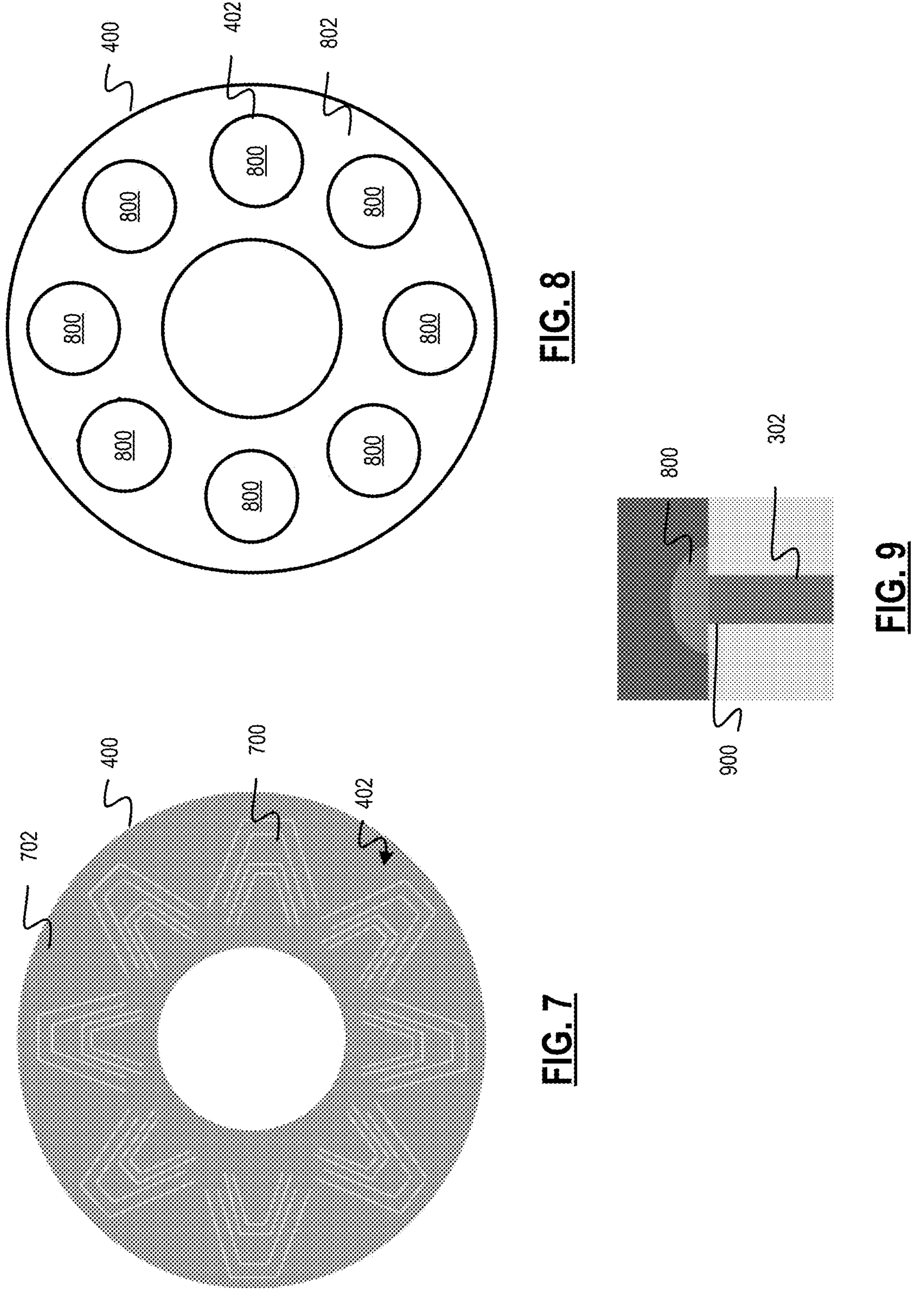
FIG. 7 is a functional block diagram representation of a deformable end ring including a plurality of deformable areas in the form of cantilevered beams accordance with at least one embodiment.
FIG. 8 is a functional block diagram representation of a deformable end ring including a plurality of closed cell foam caps in accordance with at least one embodiment.
FIG. 9 is a functional block diagram of a side view of a partially ground magnet end of a partially ground magnet abutting against a closed cell foam cap in accordance with at least one embodiment.

Referring to FIG. 7, a functional block diagram representation of a deformable end ring 400 (400*a* and 400*b* are collectively referred to as 400) including a plurality of deformable areas 402 in the form of cantilevered beams 700 accordance with at least one embodiment is shown. The deformable end ring 400 is a metallic deformable end ring. In at least one embodiment, each of the deformable areas 402 includes a cantilevered beam 700. A force of a partially ground magnet end of a partially ground magnet 302*a*, 302*b*, 302*d* against a cantilevered beam 700 causes a deformation of the cantilevered beam 700. The deformation of cantilevered beam 700 in the deformable area 402 accommodates the portion of the partially ground magnet that extends beyond a rotor core surface.

The deformable end ring 400 includes the plurality of deformable areas 402 and a non-deformable area 702. In at least one embodiment, the non-deformable area 702 has a first thickness. The cantilevered beams 700 in the deformable areas 402 are thinned. The thinned cantilever beams 700 have a second thickness. The second thickness of the thinned cantilevered beams 700 is less than the first thickness of the non-deformable area 702.

Each of the plurality of partially ground magnets 302*a*, 302*b*, 302*c*, 302*d* is disposed at a partially ground magnet location within the rotor core 300. The location of each of the plurality of cantilevered beams 700 corresponds to one of the partially ground magnet locations. While the deformable end ring 400 is shown as including eight cantilevered beams 700 in FIG. 7, alternative embodiments of the deformable rings may include a greater or fewer number of cantilevered beams.

Referring to FIG. 8, a functional block diagram representation of a deformable end ring 400 (400*a* and 400*b* are collectively referred to as 400) including a plurality of closed cell foam caps 800 in accordance with at least one embodiment is shown. The deformable end ring 400 is a composite deformable end ring. The composite deformable end ring has a metallic end ring base 802 with the plurality of closed cell foam caps 800 disposed on the metallic end ring base 802. In at least one embodiment, an adhesive is used to attach the plurality of closed cell foam caps 800 to the metallic end ring base 802. Examples of materials used to manufacture the of closed cell foam caps 800 include, but are not limited to, polyurethan, epoxy, silicone, Ethylene-vinyl acetate (EVA), polyethylene, and polystyrene.

Each of the plurality of partially ground magnets 302*a*, 302*b*, 302*c*, 302*d* is disposed at a partially ground magnet location within the rotor core 300. The location of each of the plurality of closed cell foam caps 800 corresponds to one of the partially ground magnet locations. A force of a partially ground magnet end of a partially ground magnet 302*a*, 302*b*, 302*d* against a closed cell foam cap 800 causes a deformation of the closed cell foam cap 800. The deformation of the closed cell foam cap 800 in the deformable area 402 accommodates the portion of the partially ground magnet that extends beyond a rotor core surface. While the deformable end ring 400 is shown as including closed cell foam caps 800 in FIG. 8, alternative embodiments of the deformable rings may include a greater or fewer number of closed cell foam caps 800.

Referring to FIG. 9, a functional block diagram of a side view of a partially ground magnet end 900 of a partially ground magnet 402 (402*a*, 402*b*, 402*d* are collectively referred to as 400) abutting against a closed cell foam cap 800 in accordance with at least one embodiment is shown.

In at least one embodiment, each of the plurality of deformable areas 402 include a pocket. The rotor core 300 has a rotor core length 308. While there are variations in the magnet lengths of the partially ground magnets 402*a*, 402*b*, 402*c*, 402*d*, there are manufacturing tolerances that dictate a maximum allowable magnet length of the partially ground magnets 402*a*, 402*b*, 402*c*, 402*d*. Each of the pockets have a pocket depth. The pocket depth is a difference between the rotor core length 308 and the maximum allowable magnet length of the partially ground magnets 402*a*, 402*b*, 402*c*, 402*d*.

When a partially ground magnet end of a partially ground magnet 302*a*, 302*b*, 302*d* extends beyond a rotor core surface, that partially ground magnet end extends into the pocket disposed in the deformable area 402. The pocket in the deformable area 402 accommodates the portion of the partially ground magnet that extends beyond a rotor core surface.

In at least one embodiment, one or more of the partially ground magnets 302*c* have a magnet length that is less than the rotor core length 308. In at least one embodiment, a deformable end ring 400 (400*a* and 400*b* are collectively referred to as 400) includes a shim disposed in a deformable area 402 that corresponds to a partially ground magnet location of a partially ground magnet 302*c* having a magnet length that is less than the rotor core length 308. The partially ground magnet end of the partially ground magnet 302*c* abuts against the shim. The shim maintains a position of the partially ground magnet 302*c* within the rotor core 300.

In at least one embodiment, one or more of the partially ground magnets 302*c* have a magnet length that is less than the rotor core length 308. In at least one embodiment, a deformable end ring 400 (400*a* and 400*b* are collectively referred to as 400) includes a spring disposed in a deformable area 402 that corresponds to a partially ground magnet location of a partially ground magnet 302*c* having a magnet length that is less than the rotor core length 308. The partially ground magnet end of the partially ground magnet 302*c* abuts against the spring. The spring maintains a position of the partially ground magnet 302*c* within the rotor core 300.

In at least one embodiment, one or more of the partially ground magnets 302*c* have a magnet length that is less than the rotor core length 308. In at least one embodiment, a deformable end ring 400 (400*a* and 400*b* are collectively referred to as 400) includes elastomeric material disposed in a deformable area 402 that corresponds to a partially ground magnet location of a partially ground magnet 302*c* having a magnet length that is less than the rotor core length 308. The partially ground magnet end of the partially ground magnet 302*c* abuts against the elastomeric material. The elastomeric material maintains a position of the partially ground magnet 302*c* within the rotor core 300.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A magnet rotor assembly comprises:

a rotor core having a rotor core length along a longitudinal axis;

a plurality of low energy magnets disposed at a first plurality of magnet locations within the rotor core, each of the plurality of low energy magnets having an associated magnet length extending along the longitudinal axis, a first low energy magnet end, and a second opposing low energy magnet end;

a plurality of high energy magnets disposed at a second plurality of magnet locations within the rotor core, each of the plurality of high energy magnets having an associated magnet length extending along the longitudinal axis that is equal to the rotor core length, a first high energy magnet end, and a second opposing high energy magnet end; and a first deformable end ring disposed at a first end of the rotor core to retain the plurality of low energy magnets and the plurality of high energy magnets within the rotor core, wherein the first deformable end ring comprises a plurality of first deformable areas and each of the plurality of first deformable areas corresponds to one of the first plurality of magnet locations, wherein a first low energy magnet of the plurality of low energy magnets has an associated magnet length that is greater than the rotor core length and a first low energy magnet end of the first low energy magnet abuts against a first deformable area of the plurality of first deformable areas of the first deformable end ring causing a deformation of the first deformable area of the first deformable end ring, and wherein the first deformable end ring comprises a plurality of non-deformable areas, and the first high energy magnet ends of the plurality of high energy magnets are disposed adjacent the non-deformable areas of the first deformable ring.

2. The magnet rotor assembly of claim 1, further comprising a second deformable end ring disposed at a second end of the rotor core to cooperate with the first deformable end ring to retain the plurality of low energy magnets and the plurality of high energy magnets within the rotor core, and wherein:

the second deformable end ring comprises a plurality of second deformable areas and each of the plurality of second deformable areas corresponds to one of the first plurality of magnet locations, and a second low energy magnet of the plurality of low energy magnets has an associated magnet length that is greater than the rotor core length and a second low energy magnet end of the second low energy magnet abuts against a first deformable area of the plurality of second deformable areas of the second deformable end ring causing a deformation of the first deformable area of the second deformable end ring.

3. The magnet rotor assembly of claim 1, wherein the plurality of non-deformable areas have a first thickness and each of the plurality of first deformable areas has a second thickness, the first thickness being greater than the second thickness.

4. The magnet rotor assembly of claim 1, wherein each of the plurality of first deformable areas of the first deformable ring has at least one partial cut extending into the first deformable end ring.

5. The magnet rotor assembly of claim 1, wherein the plurality of first deformable areas of the first deformable ring has at least one cutout extending through the first deformable end ring.

6. The magnet rotor assembly of claim 1, wherein each of the plurality of first deformable areas of the first deformable ring comprises a cantilevered beam.

7. The magnet rotor assembly of claim 1, wherein each of the plurality of first deformable areas comprises a pocket having a pocket depth, the pocket depth being a difference between the rotor core length and a maximum allowable magnet length of the plurality of low energy magnets.

8. The magnet rotor assembly of claim 1, wherein:

the first deformable end ring comprises a plurality of closed cell foam caps wherein each of the plurality of closed cell foam caps is disposed in a corresponding one of the plurality of first deformable areas, and the first low energy magnet end of the first low energy magnet abuts against a first closed cell foam cap disposed in the first deformable area of the plurality of deformable areas of the first deformable end ring causing the deformation of the first deformable area.

9. The magnet rotor assembly of claim 1, wherein the plurality of low energy magnets have a first coercivity and the plurality of high energy magnets have a second coercivity, the second coercivity being higher than the first coercivity.

10. The magnet rotor assembly of claim 1, further comprising at least one of a shim, a spring, and elastomeric material disposed in at least one of the plurality of first deformable areas, and a third low energy magnet of the plurality of low energy magnets has an associated magnet length that is less than the rotor core length and a first low energy magnet end of the third low energy magnet abuts against the at least one of the shim, the spring, and the elastomeric material disposed on the at least one of the plurality of first deformable areas to maintain a position of the third low energy magnet within the rotor core.

11. The magnet rotor assembly of claim 1, wherein the rotor core comprises a plurality of poles and a number of the plurality of first deformable areas is equal to a number of the plurality of poles.

12. The magnet rotor assembly of claim 1, wherein the plurality of low energy magnets are ferrite magnets.

13. An interior permanent magnet motor including a magnet rotor assembly comprises:

a stator assembly; and the magnet rotor assembly rotatable relative to the stator assembly comprising:

a rotor core having a rotor core length along a longitudinal axis;

a plurality of low energy magnets disposed at a first plurality of magnet locations within the rotor core, each of the plurality of low energy magnets having an associated magnet length extending along the longitudinal axis, a first low energy magnet end, and a second opposing low energy magnet end;

a plurality of high energy magnets disposed at a second plurality of magnet locations within the rotor core, each of the plurality of high energy magnets having an associated magnet length extending along the longitudinal axis that is equal to the rotor core length, a first high energy magnet end, and a second opposing high energy magnet end; and a first deformable end ring disposed at a first end of the rotor core to retain the plurality of low energy magnets and the plurality of high energy magnets within the rotor core, wherein the first deformable end ring comprises a plurality of first deformable areas and each of the plurality of first deformable areas corresponds to one of the first plurality of magnet locations, wherein a first low energy magnet of the plurality of low energy magnets has an associated magnet length that is greater than the rotor core length and a first low energy magnet end of the first low energy magnet abuts against a first deformable area of the plurality of first deformable areas of the first deformable end ring causing a deformation of the first deformable area of the first deformable end ring, and wherein the first deformable end ring comprises a plurality of non-deformable areas, and the first high energy magnet ends of the plurality of high energy magnets are disposed adjacent the non-deformable areas of the first deformable ring.

14. The interior permanent magnet motor of claim 13, wherein the plurality of non-deformable areas have a first thickness and each of the plurality of first deformable areas has a second thickness, the first thickness being greater than the second thickness.

15. The interior permanent magnet motor of claim 13, wherein each of the plurality of first deformable areas of the first deformable ring has at least one partial cut extending into the first deformable end ring.

16. The interior permanent magnet motor of claim 13, wherein each of the plurality of first deformable areas of the first deformable ring has at least one cutout extending through the first deformable end ring.

17. The interior permanent magnet motor of claim 13, wherein each of the plurality of first deformable areas of the first deformable ring comprises a cantilevered beam.

18. A vehicle including an interior permanent magnet motor comprises:

a stator assembly; and a magnet rotor assembly rotatable relative to the stator assembly comprising:

a rotor core having a rotor core length along a longitudinal axis;

a plurality of low energy magnets disposed at a first plurality of magnet locations within the rotor core, each of the plurality of low energy magnets having an associated magnet length extending along the longitudinal axis, a first low energy magnet end, and a second opposing low energy magnet end;

a plurality of high energy magnets disposed at a second plurality of magnet locations within the rotor core, each of the plurality of high energy magnets having an associated magnet length extending along the longitudinal axis that is equal to the rotor core length, a first high energy magnet end, and a second opposing high energy magnet end; and a first deformable end ring disposed at a first end of the rotor core to retain the plurality of low energy magnets and the plurality of high energy magnets within the rotor core, wherein the first deformable end ring comprises a plurality of first deformable areas and each of the plurality of first deformable areas corresponds to one of the first plurality of magnet locations, wherein a first low energy magnet of the plurality of low energy magnets has an associated magnet length that is greater than the rotor core length and a first low energy magnet end of the first low energy magnet abuts against a first deformable area of the plurality of first deformable areas of the first deformable end ring causing a deformation of the first deformable area of the first deformable end ring, and wherein the first deformable end ring comprises a plurality of non-deformable areas, and the first high energy magnet ends of the plurality of high energy magnets are disposed adjacent the non-deformable areas of the first deformable ring.

19. The vehicle of claim 18, further comprising, a second deformable end ring disposed at a second end of the rotor core to cooperate with the first deformable end ring to retain the plurality of low energy magnets and the plurality of high energy magnets within the rotor core, and wherein:

the second deformable end ring comprises a plurality of second deformable areas and each of the plurality of second deformable areas corresponds to one of the first plurality of magnet locations, and a second low energy magnet of the plurality of low energy magnets has an associated magnet length that is greater than the rotor core length and a second low energy magnet end of the second low energy magnet abuts against a first deformable area of the plurality of second deformable areas of the second deformable end ring causing a deformation of the first deformable area of the second deformable end ring.

20. The vehicle of claim 18, wherein the plurality of non-deformable areas have a first thickness and each of the plurality of first deformable areas has a second thickness, the first thickness being greater than the second thickness.

* * * * *